Feb. 14, 1967  J. B. PLATNER ETAL  3,303,832
HIGH OUTPUT ENGINES

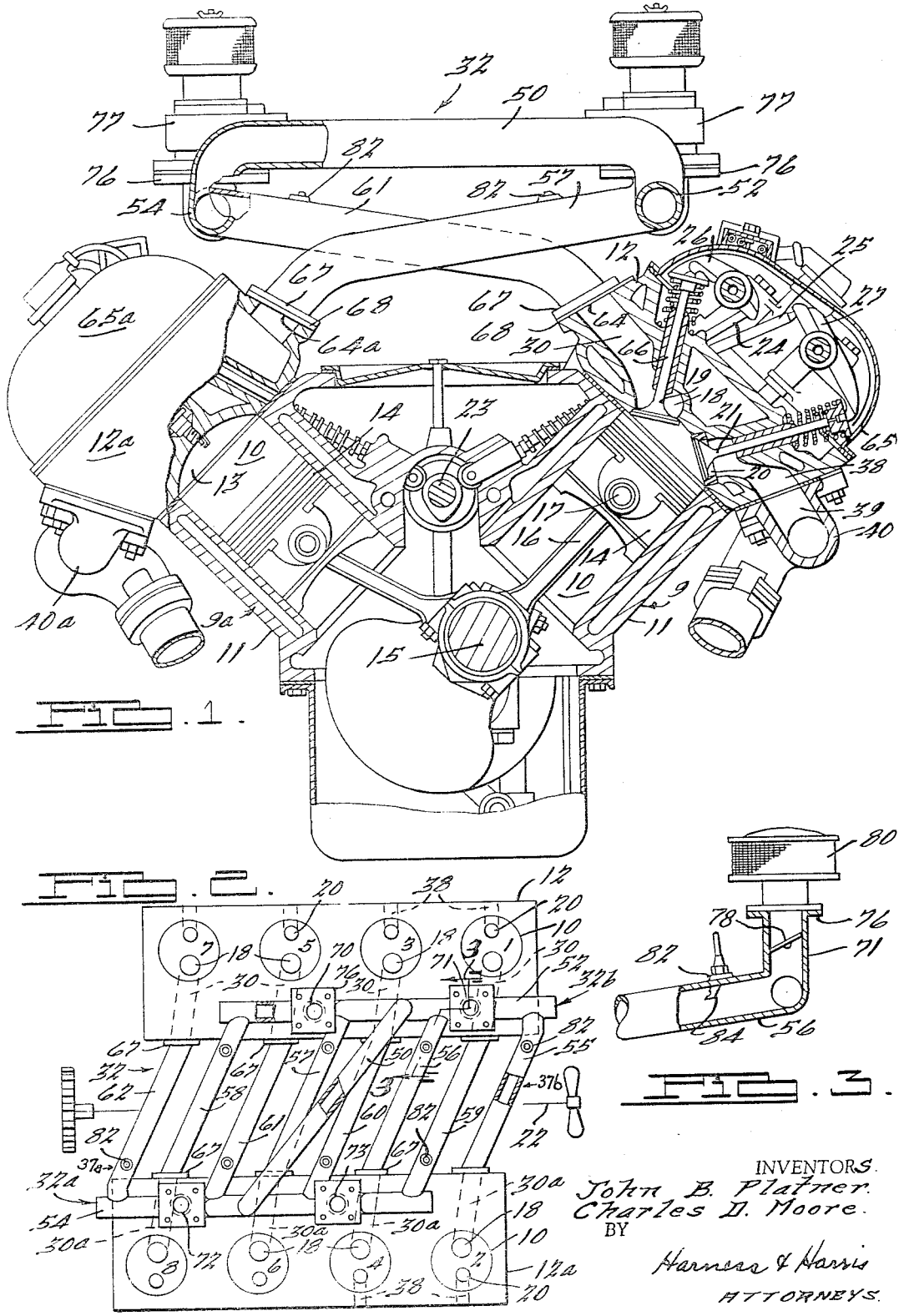

Filed May 6, 1957  5 Sheets-Sheet 2

INVENTORS.
John B. Platner.
Charles D. Moore.
BY
Harness & Harris
ATTORNEYS.

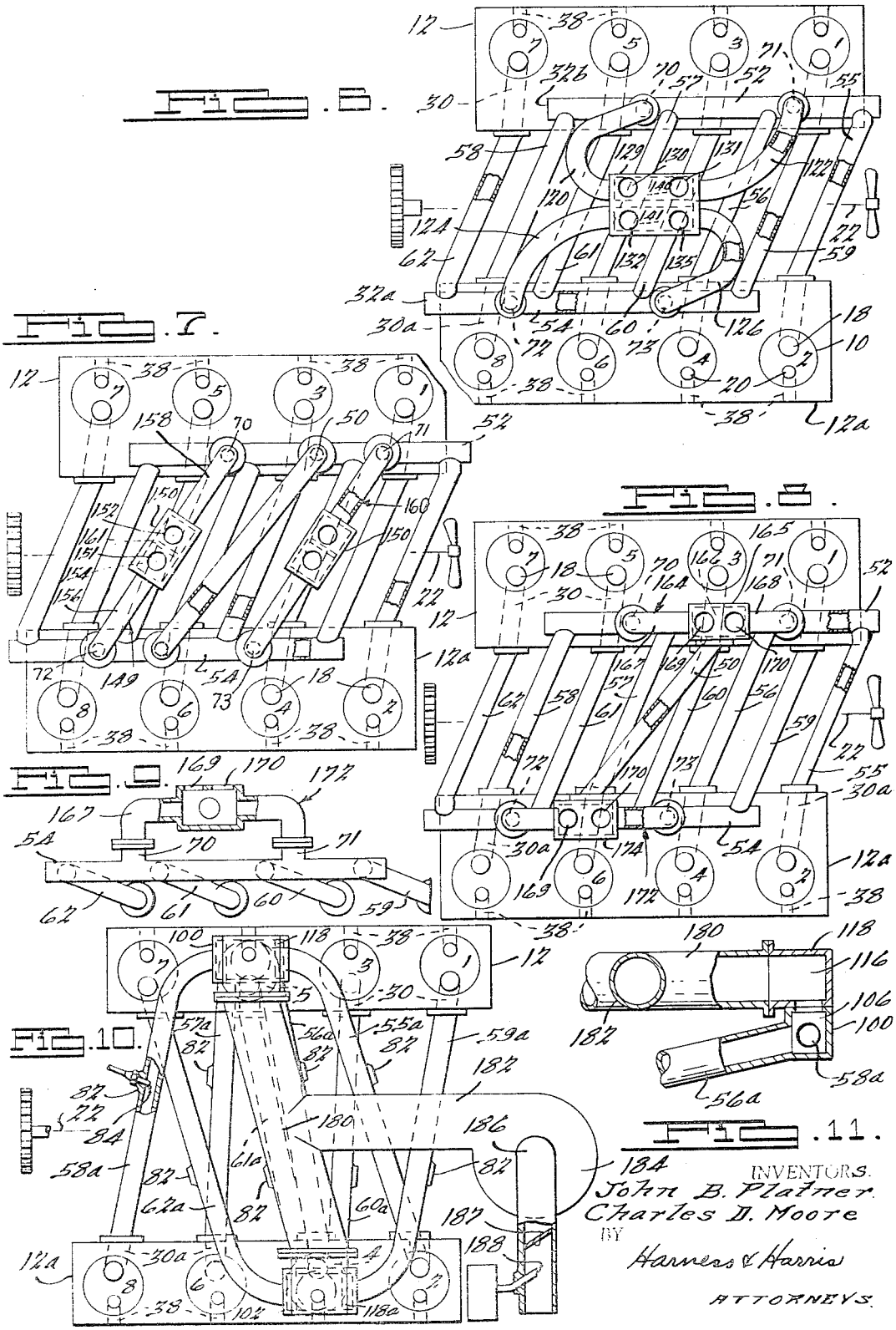

INVENTORS.
John B. Platner.
Charles D. Moore.
BY
Harness & Harris
ATTORNEYS.

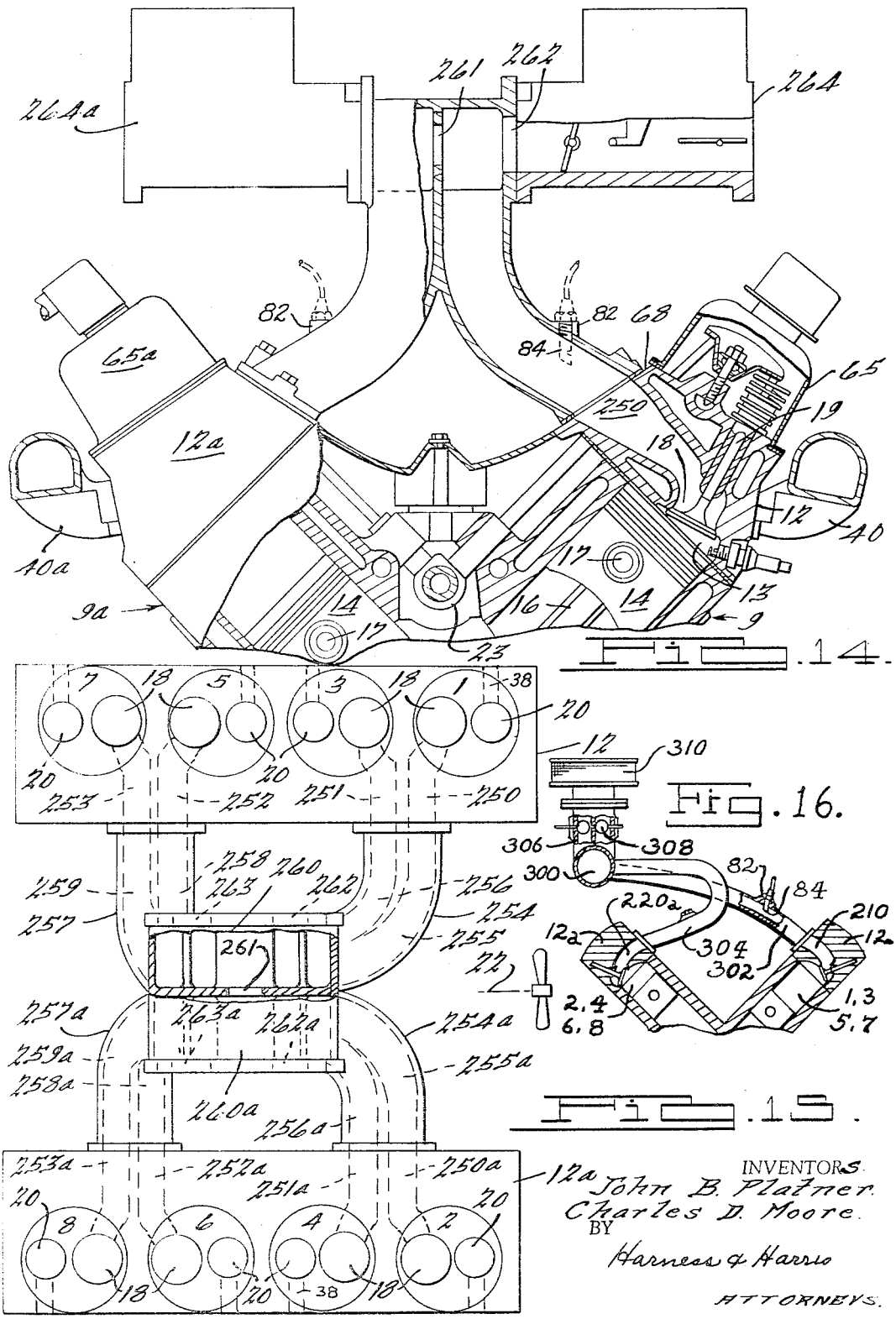

United States Patent Office 3,303,832
Patented Feb. 14, 1967

3,303,832
HIGH OUTPUT ENGINES
John B. Platner, Detroit, and Charles D. Moore, Birmingham, Mich., assignors to Chrysler Corporation, Highland Park, Mich., a corporation of Delaware
Filed May 6, 1957, Ser. No. 657,153
45 Claims. (Cl. 123—52)

The present application is a continuation-in-part of our application Serial No. 373,376, filed August 10, 1953, now Patent No. 2,791,205, which is a continuation-in-part of our application Serial No. 297,318, filed July 5, 1952, now Patent No. 2,766,743.

This invention relates to high output engines for driving motor vehicles. It especially relates to engines of this character particularly V-engines provided with improved intake systems capable of dynamic charging and that may utilize carburetion or injection feeding of fuel.

An object of the present invention is to provide an engine having opposed banks of cylinders with a double runner type intake manifold wherein long side branches connect each intake passage of a cylinder bank with the runner passage of the opposite bank and where the intake passage is of such character and length as to provide harmonic resonant tuning of the system and thereby effect dynamic charging of the cylinders.

Another object is to provide a long branch manifold of the foregoing type wherein the runners are replaced by a distribution chamber.

Still another object is to provide a long branch manifold wherein the branches sweep upwardly from the intake passages of the cylinders and terminate in a central group or side group.

A further object is to provide an engine with an intake manifold structure as in the preceding objects utilizing fuel feeding by carburetion or injection.

Other objects and advantages of our invention will appear from the following description and from the drawings wherein:

FIGURE 1 is an end elevational view partly in section of a typical V engine to which the features of our invention have been applied and which is shown as viewed from the front or fan end of the engine;

FIGURE 2 is a plan view schematically illustrating the intake manifolding of our invention of FIGURE 1 as applied to a V-8 engine and designed to provide dynamic charging by harmonic resonant tuning and inertia, the manifold being shown as designed for feeding by four single downdraft carburetors shown in FIGURE 1, or four air intakes coupled with fuel injection nozzles for each branch passage;

FIGURE 3 is a fragmentary section taken at 3—3 of FIGURE 2 showing the manner of adapting the system in FIGURE 2 for continuous liquid fuel injection, as described in our copending application aforesaid, the carburetors and venturi of FIGURE 1 being replaced by a throttle and air cleaner;

FIGURE 6 is a plan view schematically illustrating a modification of the tuned intake system of FIGURE 2 arranged to utilize a single four-barrel carburetor;

Figure 5:
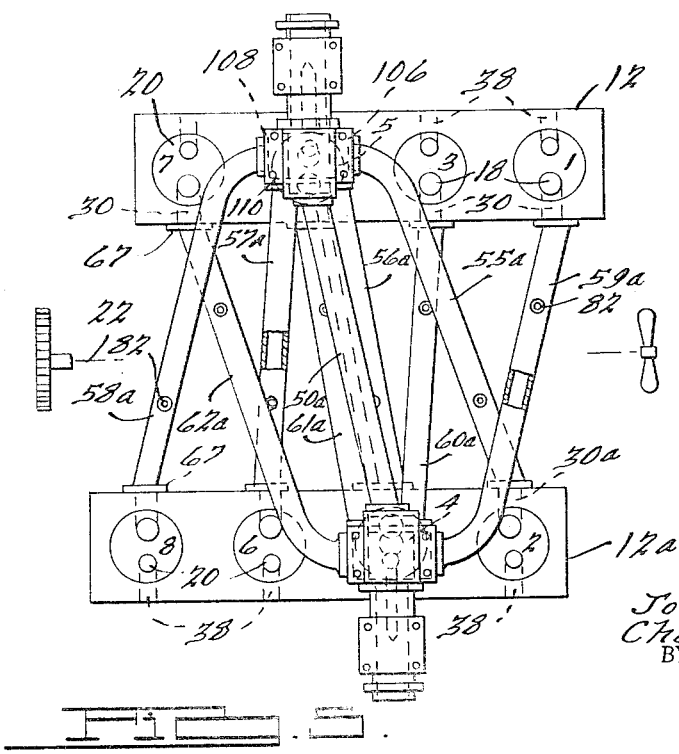
FIGURE 5 is a plan view schematically illustrating the intake manifolding of FIGURE 4.
Figure 12:
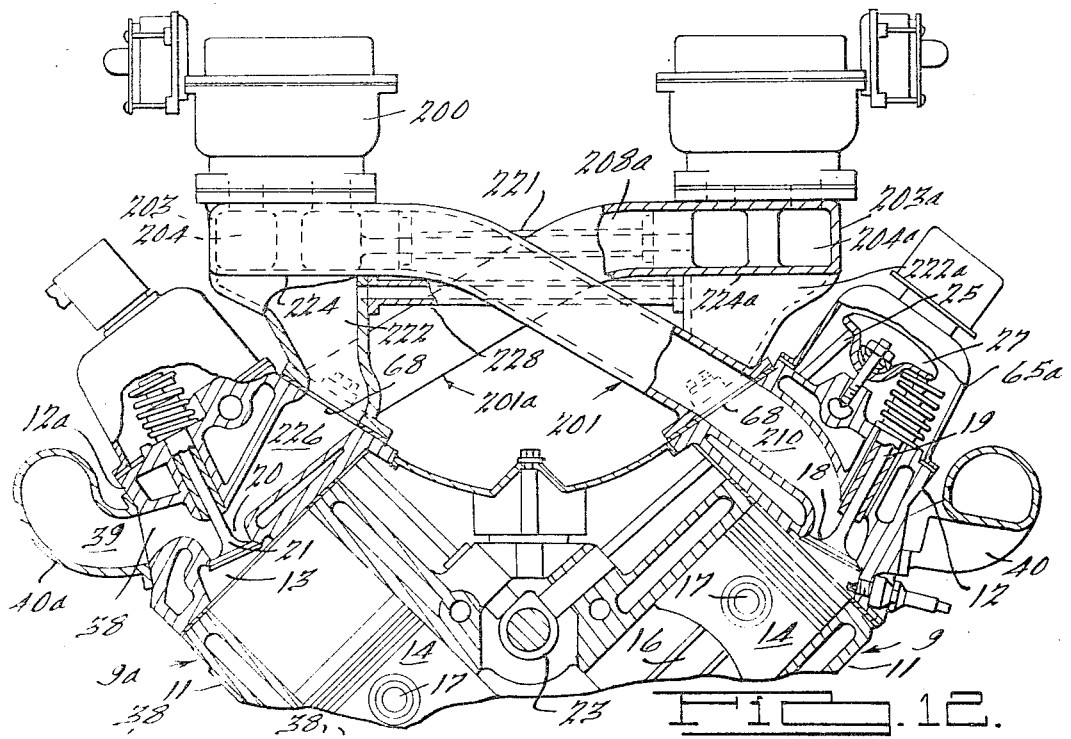
Figure 13:
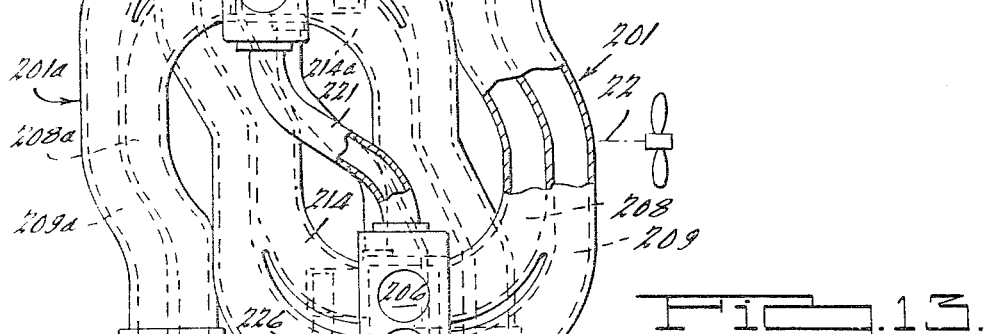

FIGURES 7, 8, and 9 show further modifications adapted for using a pair of dual carburetors;

FIGURES 10 and 11 show the FIGURE 5 arrangement modified to utilize fuel injection and centrifugal supercharging;

FIGURES 12 and 13 show a modification of the engine manifolding of FIGURE 5 as applied to an engine having all its inlet and exhaust valves in a single line and illustrated in FIGURE 12 to utilize a pair of dual barrel downdraft carburetors for air and fuel feeding; and FIGS. 14, 15 and 16 show a further intake arrangement applicable to carburetion or injection feeding as applied to an engine in which the valves are in a single line and in which the induction passages or stacks upsweep to the mid section of the engine or to one side thereof.

Referring now to the drawings wherein similar numerals are used to designate similar parts in the structure, FIGURE 1 shows a cross section of a V engine, for instance a V-8 engine of current manufacture provided with the improved manifolding of our invention.

As seen in FIGURE 1, the engine has two banks 9 and 9a of cylinders 10 arranged at a suitable angle for instance 90° in cylinder blocks 11 and to which cylinder heads 12 and 12a are secured and provided with suitably shaped combustion chambers 13, preferably of the hemispherical type, immediately above each cylinder 10. The cylinders of each bank are preferably aligned longitudinally of the engine and the cylinders of the opposite banks are offset longitudinally relative to each other. For convenience of reference, the cylinders of the cylinder bank which is to the left looking forwardly from the flywheel end of the engine are numbered 1, 3, 5, and 7 starting such numbering at the opposite or fan end of the engine and those of the right bank are numbered 2, 4, 6, and 8, respectively, these numerals appearing internally of the cylinder representations in FIGS. 2, 5, 6, 7, 8, 10, 13, and 15.

Each cylinder is provided with a piston 14 reciprocable therein and operably connected to a crankshaft 15 through a connecting rod 16 and wrist pin 17. Crankshaft 15 may be of any type but will preferably be of the 90° type wherein double crank throws are arranged at 90° to each other, the first connecting with the pistons of cylinders 1 and 2, the second with the pistons of cylinders 3 and 4, the third with the pistons of cylinders 4 and 5, and the fourth with the pistons of cylinders 7 and 8. Alternatively, the second and third throws may be interchanged such that the second throw is 270° of crank rotation from the first throw counting clockwise looking at the flywheel end of the engine whereas in the first described arrangement the second throw is only 90° of crank rotation from the first (see FIGURES 6, 7, 8, and 9 of our Patent 2,776,743).

Various firing orders are obviously possible for the two described crank arrangements, an example of that for the first being 1–8–4–3–6–5–7–2 and an example of that for the second being 1–8–6–5–4–3–7–2, these firing orders providing alternate suctions between opposite banks of cylinders except for two cylinders of each bank which fire successively, to wit, the cylinders 8 and 4 and 5 and 7 in the first crank arrangement and the cylinders 8 and 6, and those of the cylinders 3 and 7 of the alternative crank arrangement.

The hemispherical combustion chambers or cavities 13 of the cylinders 10 are by preference each provided with a single inlet opening or port 18 closed by an inlet valve 19 and with a single smaller exhaust outlet or port 20 closed by an exhaust valve 21, these valves being arranged as seen in FIGURE 1, transversely of the longitudinal axis 22, of the engine. It will be understood that other valve arrangements may be employed with suitable chamber arrangements. For instance, all the valves of the engine may be arranged side-by-side longitudinally of the engine with pairs of intake valves alternating with pairs of exhaust valves.

The inlet and exhaust valves of both banks of the engine are preferably operable from a single camshaft 23 located above the crankshaft 15, the camshaft actuating roller tappet push rods 24 and 25 respectively of the inlet and exhaust valve mechanism which in turn actuate, respectively, the inlet valve rocker arms 26, and exhaust valve rocker arms 27, these rocker arms actuating in turn the normally spring held closed valves 19 and 21.

By preference the camshaft 23 is arranged to open the respective inlet valves 19 before top dead center position of the piston, and to close the exhaust valve after top dead center position of the piston so as to maintain the intake valve open during a large portion of the crank rotation and to maintain the exhaust valve open long enough to obtain an overlap between opening of the inlet valve and closing of the exhaust valve of each cylinder.

As seen in FIGURE 2, the inlet openings 18 of the inlet valves 19 for each cylinder are located at the inner terminus of intake or induction passages or conduits generally designated by the numeral 30 in the head 12 and 30a in the head 12a. These passages 30, 30a connect with associated passages of an intake manifold generally designated by the numeral 32, and which may comprise complementary sections 37a and 37b, the first feeding one bank 12 of cylinders and the other the opposite bank 12a of cylinders. The intake manifolding connects by continuous passage means, the intake inlets 18 with a source of air and of fuel which as hereinafter seen may be supplied by carburetion or injection such also being true of all forms of the invention hereinafter described.

The exhaust valves 21 as seen in FIGURE 1, are associated with exhaust passages 38 in the cylinder heads 12 and 12a and these connect with passages 39 of collection headers 40, 40a of the exhaust manifolding of the opposite banks which conduct the exhaust gases away from the combustion chambers 13 during the exhaust stroke of the pistons. It will be understood that suitable structure making connection with the exhaust system or engine cooling system may be provided to effect heating of the intake manifold passages.

FIGURES 1 to 3 inclusive illustrate our novel double runner or plenum type long branch intake manifold system 32 as applied to a V–8 engine and which as previously stated may provide for feeding of an air-fuel mixture to the cylinders by suitable carburetors or provide for continuous pressure feeding of a liquid fuel such as gasoline or alcohol from a suitable source such as is shown and described in our copending application aforesaid under pump and other valve controls there shown and described.

As seen, the intake structure is disposed between the two banks 12 and 12a of cylinders and may comprise two elongated separate similar complementary sections 32a and 32b, each providing for the needs of a single bank or may be of unitary construction by suitable connections between the sections. Together they provide opposite distribution or plenum chambers illustrated in FIGURE 2 as elongated closed ended runner conduits, or ducts 52, 54 each disposed in juxtaposition to a different bank of the engine and each connecting by transversely directed long branch conduits or tunable pipes with the intake passages of the cylinders of the opposite bank of cylinders. Thus the longitudinal runner conduit 52 adjacent the bank 12 connects by separate, relatively long, transversely extending branch conduit passages 55, 56, 57, and 58 with the intake passages 30a respectively of the cylinders 2, 4, 6, and 8 of the opposite bank 12a of cylinders. Similarly the runner conduit 54 adjacent the bank 12a connects by separate transversely extending branch conduits 59, 60, 61, and 62 with the intake passages 30 respectively of the cylinders 1, 3, 5 and 7 of the opposite bank 12 of cylinders.

The transverse branches are preferably uniformly spaced apart at their respective runners and as seen in FIGURE 2 extend from the runners at a general oblique angle thereto with the side branches of one runner alternating in effect and interlacing with those of the opposite runner. Moreover, as seen in FIGURE 1, the transverse branch conduits extend upwardly and outwardly from the cylinder head sets 64, 64a of the bank with which they connect and then connect with their runner plenum chambers or conduits at a position above the rocker mechanism covers 65, 65a just inside the upper end of the intake valve stems 66 to provide clearance for removal of the covers. Moreover, the branch conduits of one bank cross those of the other bank as seen in the plane of FIGURE 1 providing a space beneath their crossing for control mechanism (not shown).

As shown in FIGURE 2, each of the branch conduits has a mounting flange 67 at the seat 64 of the cylinder head with which it connects through a gasket 68 and if desired all of the mounting flanges adjacent a bank may be connected to provide a single elongated mounting such being preferred when the sections 32a and 32b are made as a single unit.

The runner 52 as seen in FIGURES 1, 2, and 3 is preferably provided with a pair of short vertical branches or risers 70, 71. Similar risers 72, 73 are located on the runner conduit 54. Each riser is preferably located intermediate a different pair of branches of its runner and which are a pair nearest an end of the engine, that is to say, an outermost pair of branches of its runner longitudinally of the engine. By preference the risers 70, 71, 72, and 73 are located somewhat nearer the innermost of the pair of side branch conduits between which it is located. This has been found to aid in obtaining better mixture distribution especially where carburetors are the source of fuel.

Each riser preferably terminates as seen in FIGURES 1 to 3 in a mounting seat or flange 76. When the manifold is to be fed by carburetors, a separate carburetor unit 77 (see FIGURE 1) is mounted over each of the four risers in FIGURE 2. These carburetors are preferably as seen in FIGURE 1, single barrel, downdraft type carburetors of the Ball and Ball type having a built-in throttle control and venturi. When the manifold system of FIGURES 1 and 2 is to be used with fuel injection, the riser branches are preferably made long enough to provide, as seen in FIGURE 3, a suitable throttle control 78 and each mounting seat 76 has preferably secured thereon a unit air cleaner 80 of suitable capacity. In addition, each side branch conduit is preferably provided, as seen in FIGURES 1, 2, and 3 downstream of the air entrance connection with the runner with a mounting pad 82 to receive a fuel injection nozzle 84 which projects downstream of the branch conduit. These nozzles may be continuously fed with fuel in the manner shown and described in our copending application Serial No. 373,376 aforesaid which showing is incorporated by reference herein.

It will be observed that the long branch runner type of intake manifolding described above is admirably suited to structurally provide the pipe arrangements required for a system having the harmonic resonant tuning effects described in our copending application aforesaid and calling for intake passage lengths L between air intake and intake valve inlet embraced by the empirical formula $72C/N \pm 3$ where N is the engine speed in revolutions per minute at the predetermined speed of the engine at which performance is to peak and C is the velocity of sound in feet per second in air in the intake passage under the atmosphere temperature and pressure conditions at which the engine is to be operated.

In utilizing this formulation with a *long* branch, long runner manifold of the type shown in FIGURE 2 or where as shown in subsequent forms of the invention to be described such as in FIGURES 5, 13, and 15 a more compact (lengthwise) common runner or plenum chamber structure is provided at the outer ends of the branch passages or pipes to be tuned to harmonic resonance, some deviation or correction may be found desirable for best results, depending upon the effect of the runner or plenum chamber and carburetors (when used) upon the overall response frequency of the induction system.

In our copending application aforesaid, the length L in the formulation was indicated to be measured from the open end of the long pipes or barrels, i.e., the air entrance of these pipes.

Where a plenum chamber or runner connects the outer ends of the branch pipes and the plenum volume is large and the length or distance to the actual air entrance of the chamber or runner from the branch inlet is not substantial, the damping effect and influence of such chambers and of the carburetor venturi upon the overall response frequency of the system is believed relatively small and the length L in the formulation is that of the long branch pipes and is to be measured from their open ends or the intersection thereof with the plenum chamber.

On the other hand, when the plenum or runner volume is small and the length or distance to the actual air entrance of the chamber or runner to the branch entrance of the long branches is relatively great, then the plenum volume and its frequency could effect the frequency of the branch pipes. This is especially believed true in the case of fuel injection feeding and where large engine displacements are involved. In such cases it may be desirable to vary the branch length somewhat from the calculated value.

The manifold arrangement of FIGURE 2 provides dynamic charging of the cylinders by resonant tuning effects and by mass movement of air (inertia effects) over substantially the full speed range 1200–4000 r.p.m. of the engine. The runners or plenum chambers provide a means of obtaining substantially uniform and unobstructed intake passage lengths for the branch passages to be tuned for optimum dynamic charging. Where multiple carburetion is used they aid in obtaining good fuel distribution and where fuel injection is employed they make possible a reduction in the number of throttle blades and controls required. For example, the arrangement in FIGURE 2 enables use of a single throttle and air cleaner for each pair of side branches and cylinders. This is especially suited for passenger car engines since a lesser number of throttles improves idling operation and makes it smoother than would be possible with a separate throttle for each cylinder.

An engine operated with the manifolding of FIGURE 2 will provide high torque outputs in the mid speed range of the engine with normal power at the power peak in the high range.

The constructions in FIGURES 1, 2, and 3 are preferably provided with an inverted U-shaped crossover or balancing conduit 50 between the runners 52 and 54 preferably located between the inner pair of branch conduits of each runner. This device aids in improving the uniformity of the air-fuel mixture delivery of the carburetors over the entire speed range. It may be omitted entirely when fuel injection is employed. If used it aids in balancing the manifold pressures at idle speeds.

Figure 4:
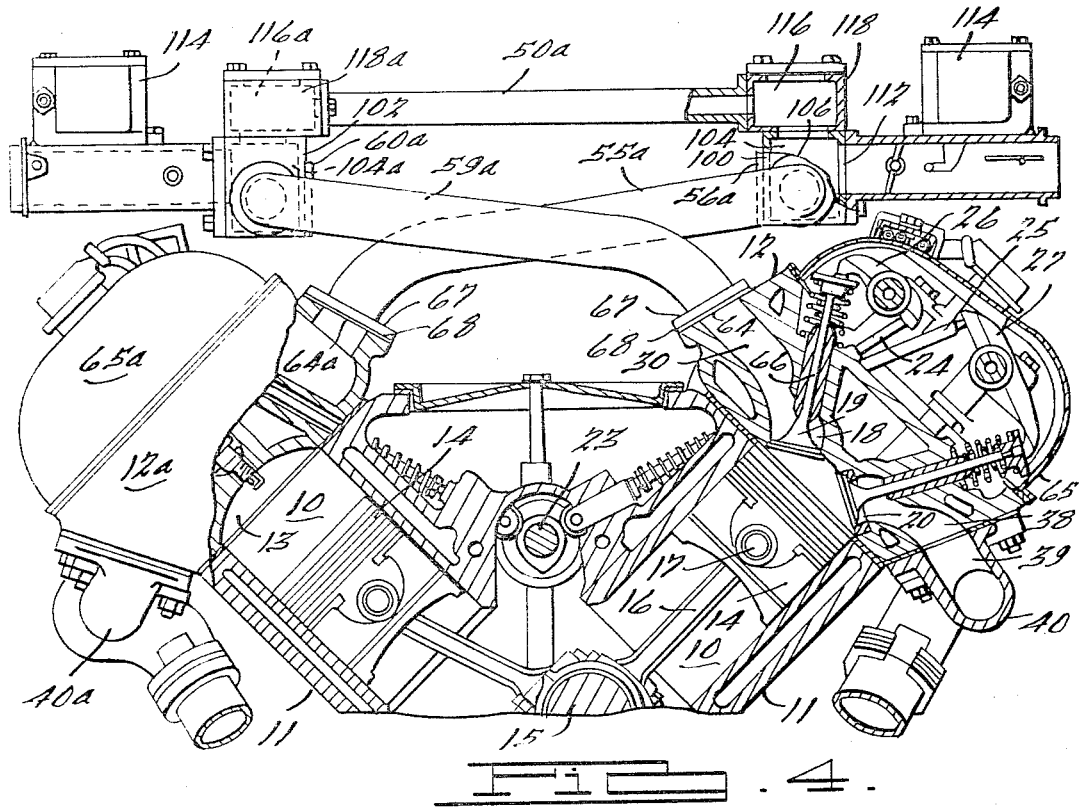
FIGURE 4 is an end elevational view similar to that of FIGURE 1 of a more compact induction system provided with harmonic resonant tuning and utilizing dual side draft carburetion and air-fuel distribution balancing.

In FIGURES 4 and 5 we have illustrated a form of our invention wherein the runners or plenum chambers of FIGURE 2 have been compacted lengthwise of the engine to employ a large plenum chamber for each set of branches having a minimum effect upon the response frequency of the induction system. This arrangement also makes possible the efficient use of a single carburetor unit or air cleaner for each bank. It also makes more space available for accessory equipment and provides a more suitable manifold structure to which engine exhaust or coolant water heat may be applied for improved cold weather warmup.

The runners or plenum chambers in FIGURES 4 and 5 are preferably in the form of rectangular distribution boxes or junction units 100, 102. Plenum box 100 for cylinders of bank 12a is preferably located longitudinally of the engine to permit use of optimum branch lengths and as shown is positioned approximately above cylinder No. 5 of the bank 12. Box 100 provides a chamber 104 into which the long cross branches 55a, 56a, 57a, and 58a corresponding to the branches 55–58 inclusive of FIGURE 2 and connecting respectively with the intake branches 30a of cylinders Nos. 2, 4, 6, and 8 of bank 12a may open. Preferably branches 55a and 58a open into the chamber 104 through the end walls 106, 108 respectively, of the chamber 104 and the branches 56a and 57a both open into this chamber through the inner side wall 110 thereof at adjacent positions, in substantially the same plane to each other and in substantially the same plane as the branches 55a and 58a.

Plenum box 102 is approximately located above cylinder No. 2 of the opposite bank 12 and provides a chamber 104a into which the branches 59a, 60a, 61a, and 62a feeding cylinders 1, 3, 5, and 7 of bank 12 may open and in a similar manner described with respect to the long branches connecting plenum box 100. It will be noted that here as in FIGURE 2 the intake manifold may be constituted of two similar sections or may be a single unit. Moreover, the long branch conduits of each set interlace with each other, in this case not only crossing in elevation as seen in FIGURE 4, but adjacent branches also crossing as seen in FIGURE 5. The arrangement shown makes the plenum box 100 and its associated branch conduits interchangeable with the plenum box 102 and its associated branch conduits. It will be understood that the mounting flanges 67 of the branch conduits of each bank may be connected by separate interconnecting plates if desired to reinforce the conduit structure and without effecting assembly.

Where as shown the manifold is to be fed by carburetion, each plenum box 100, 102 has preferably seated against its outer side wall 112 a carburetor unit 114 preferably in the form of a dual barrel side draft carburetor, that shown being of the "Zenith" type.

The arrangement in FIGURES 4 and 5 as in the case of the FIGURE 1 construction may provide a crossover balancing connector tube identified by the numeral 50a corresponding to the tube 50 in FIGURE 1 and for similar purposes. As seen in FIGURE 4, this crossover tube 50a is located above the branch conduit system and has its ends opening into chambers 116, 116a respectively, of boxes 118, 118a respectively, which seat upon the branch conduit junction boxes 100, 102 respectively with openings provided in the adjacent walls of these boxes whereby the chamber 116 opens into the chamber 104 and the chamber 116a opens into the chamber 104a.

Where the arrangement in FIGURE 5 is to be employed with continuous injection feeding of fuel in a manner similar to that described with respect to the construction in FIGURES 2 and 3, each branch passage will be provided with an injection nozzle downstream of the plenum box for instance at mounting 82 in FIGURE 5 and the carburetor will be replaced by an air cleaner and throttle as shown in FIGURE 3. As thus arranged there will be a single main air entrance and a single throttle control for the cylinders of an entire bank thus further simplifying the control arrangement.

In FIGURE 6 the construction of the long branch double runner plenum chamber type manifold of FIGURE 2 has been modified to provide for the use of a single carburetor of the four-barrel type illustrated in our Patent No. 2,766,743 and which may be arranged for staging control whereby a pair of barrels will initially direct air-fuel mixture to the runners 52, 54, one barrel feeding each runner and at a later predetermined time as when higher outputs are required of the engine the second pair of barrels will be made to feed their air-fuel mixture to these conduits, one barrel feeding to each conduit. As shown in FIGURE 6, suitable conduits 120, 122, 124, and 126 extend from the risers 70, 71, 72, and 73 respectively of the runners 52 and 54 joining in a central distribution body 129 at a position intermediate the runners 52 and 54 and immediately above the tuned transverse branch conduits that extend from the runners 52, 54 to the cylinder banks. The body 129 is arranged to have mounted upon its top face a suitable four-barrel carburetor, the barrels of which respectively connect with short risers or openings 130, 131, 132, and 133 in the central body 129. The body 129 preferably has a pair of chambers 140, 141. The conduits 120, 122 open into the chamber 140 from the ends of the body and the carburetor riser openings 130, 131 likewise open into this chamber. Thus by means of the risers 130, 131 and chamber 140 the carburetor feeds its air-fuel mixture to the runner 52 which in turn distributes the air-fuel mixture to cylinders numbered 2, 4, 6, and 8 of the bank 12a. In a similar manner the chamber 141 is connected by the conduits 124 and 126 and has the risers 132, 133 opening into it. This chamber 141 distributes the air-fuel mixture through the conduits 124, 126 to the runner 54 which in turn distributes the air-fuel mixture to cylinders numbered 1, 3, 5, and 7 of the bank 12. As stated above, the four-barrel carburetor may be staged so that the barrels delivering air-fuel mixture to risers 131, 133 shall be activated first and the barrels delivering air-fuel mixture to the risers 130, 132 rendered active at a subsequent time in the engine operation.

It will be noted that the conduits 122 and 124 are similarly shaped as are the conduits 120 and 126 such that these conduits may be made a unit with the body 129 and may be assembled with the runners 52, 54 without need for making a particular conduit connect with a certain riser of the runners.

It will be obvious that this arrangement in FIGURE 6 may be adapted for advantageous feed of air and fuel by fuel injection by modifying the body 129 to act as a source of intake of air for each of the runners and providing the injection nozzles 82 of FIGURE 2 in the relative position shown in that figure on the branch conduits of FIGURE 6. Moreover, although the crossover member 50 of the FIGURE 2 arrangement has not been shown in FIGURE 6, it will be understood that this balancing device may be employed if desired in the same manner as that in FIGURE 2.

In FIGURES 7, 8, and 9, we have illustrated further modifications of the long branch double runner manifold construction of FIGURE 2 aimed to reduce the number of carburetor units, simplify throttle linkage arrangements, and make more room available for accessory equipment. In FIGURE 7, the four single carburetors of FIGURE 2 are replaced by a pair of dual carburetors located intermediate the runners 52 and 54 and above the transverse branch conduits extending from the runners to the intake ports of the cylinders. In this arrangement the riser 70 of the runner 52 is connected with the riser 72 of the runner 54 by an inverted U-shaped connector conduit generally designated by the numeral 149 provided centrally thereof with a body 150 constructed to receive a dual barrel downdraft carburetor. The barrels of the carburetor are arranged to coincide with the risers 151 and 152 of this body which povides a chamber 154 below the risers into which the conduit portions 156, 158 of the interconnector open. A similar interconnector 160 and body structure 150 connects the risers 71 and 73 of the runners 52 and 54 and seats a second dual downdraft carburetor. The body structures 150 may, if desired, contain a parting wall 161 serving to separate the air-fuel distribution to the two runners. Moreover, the barrels of one carburetor may be staged with respect to those of the second. It will be understood that the arrangement in FIGURE 7 may, as in the case of the FIGURE 2 structure, be adapted for continuous feeding of fuel by injection nozzles located as there shown and by replacement of the carburetors with air cleaners and a throttle control.

In the FIGURE 8 arrangement, the FIGURE 2 construction has been modified by the employment of two dual carburetors as in the case of the FIGURE 7 arrangement but in this instance each carburetor serves only one runner and therefore furnishes its air-fuel mixture to only one bank of cylinders. As seen in FIGURES 8 and 9, the risers 70 and 71 of the runner 52 are interconnected by an interconnecting conduit structure of inverted U-shape generally designated by the numeral 164 which is of similar construction to the interconnectors 149 and 160 of FIGURE 7 in that it includes a body portion 165 providing a chamber 166 into which the conduit portions 167, 168 emanating from the risers of the runner 52 may open and which provide openings 169, 170 in the top face of the body 165 for coincidence with the barrels of the carburetor. In a similar manner the risers 72 and 73 of the runner 54 may be interconnected by a similar inverted U-shaped interconnecting conduit 172 of similar construction to the interconnector 164 which has a body portion 174 with openings 169, 170 over which to mount a dual carburetor. In the FIGURE 8 construction the interconnector 50 between the runners 52 and 54 will make its connection with the runners as in the case of the FIGURE 2 arrangement substantially midway the ends thereof and beneath the body portions 165 and 174 of the carburetor adaptors.

In FIGURES 10 and 11 we have shown an intake manifold construction such as in FIGURES 4 and 5 adapted for fuel injection feeding of fuel and wherein the air supplied to the system is supercharged. In this arrangement the balance connector 50a of the FIGURE 5 construction is replaced by a large air induction tube 180 connecting with the chambers 118 and 118a and which is connected at its mid point by a conduit 182 from the output side of a centrifugal blower generally designated by the numeral 184. The blower has as shown an intake conduit 186 provided with a throttle control 187 and a fuel injection nozzle 188 connected with a fuel pump and control mechanism of the character shown in our copending application aforesaid.

With this arrangement it is possible to obtain higher torques over the full range of operation of the engine which is desired for passenger car operation. The controls are simple since only a single throttle is provided. The arrangement, moreover, provides the advantageous dynamic charging due to the harmonic resonant tuning of the pipes, such giving adequate torque outputs for the lower and middle speed ranges of operation of the engine and the supercharger providing improved torque outputs for the engine in the high speed range of operation. In determining pipe lengths the formula above given will utilize a value for C corresponding to the air density provided by the centrifugal blower. It is noteworthy that tuning of the manifold branches is not disturbed by the air dynamics provided by the centrifugal blower.

FIGURES 12 and 13 show our invention applied to a V engine having all its valves in each bank in a single line. As shown, the cylinders of each bank may be fed by a pair of dual downdraft carburetors 200 through complementary manifold sections generally designated by the numerals 201 and 201a. Section 201 is arranged to direct air and fuel to cylinders 2, 4, 6, and 8 of the bank 12a. This section 201 comprises a body, box or plenum chamber portion 203 positioned over the bank 12a and located to permit removal of the rocker mechanism cover 65a of the engine. It is moreover located longitudinally of the engine approximately adjacent cylinder No. 4. The body portion 203 provides a chamber 204 having a pair of riser openings 206, 207 in its upper face arranged to coincide with the barrels of the dual carburetor 200, these risers opening into the chamber 204. A pair of air-fuel conducting conduits or passages 208, 209 connects through the front face of the body 203 with the chamber 204 into which they open. These conduits extend forwardly and then transversely and downwardly from the body portion 203, preferably forming smooth curves where they change direction, and connect with the juxtaposed intake passages 210, 212 of the head 12 connecting with the intake openings 18 of cylinders Nos. 1 and 3. In a similar manner a pair of conduit passages 214, 216 extend from the rear side of the body 203 and connect with the intake passages 218, 220 in the head 12 associated with the intake openings 18 of cylinders 5 and 7 respectively.

The section 201a is of similar construction to the section 201 so that it may be interchangeably employed with the section 201 in assembly of the engine. The section 201a has corresponding pairs of paralleling conduit passages extending from its body 203a and chamber 204a to the intake passages of the bank 12a. Thus the unit 201a has air-fuel conducting conduit passages 208a, 209a connecting with the intake passages 210a and 212a for the intake valve openings 18 of cylinders Nos. 6 and 8 in the bank 12a and has a second pair of paralleling conduit passages 214a, 216a connecting with the intake passages 218a and 220a associated with the intake openings 18 of the cylinders Nos. 4 and 2 respectively in the head 12a.

It will be observed that the sections 201 and 201a are arranged such that the pairs of conduit passages of each section cross each other as viewed in elevation in FIGURE 12 and that the rear pair 214, 216 of the section 201 pass beneath the body portion 203a of the section 201a. Likewise the conduit passages 214a, 216a pass below the body portion 203 of the section 201. Moreover, it will be evident from FIGURE 12 that the transversely extending portions of each section comprising the conduit passages are substantially in alignment. In effect, the sections 201 and 201a, as viewed in FIGURE 13, are each of generally U shape with their carburetor carrying body portions at the base of the U. It will be understood that as in the other described forms of intake manifolding of this invention, the air-fuel conducting passages of that shown in these FIGURES 12 and 13 are of a length to provide harmonic resonant tuning in the system. By preference the chambers 203 and 203a are interconnected by a balancing passage or conduit 221 which connects the inner end walls of these bodies, as seen in FIGURES 12 and 13, and opens into the chambers 204 and 204a, this connecting providing the advantages described above.

In some instances it may be desirable to provide external heating for the chambers 204 and 204a. We provide this in the construction of FIGURES 12 and 13 by heating chambers 222 and 222a. The heating chamber 222 is arranged below the body portion 203 of the section 201 and has the bottom wall 224 of the latter form a part of such heating chamber. The walls of the heating chamber 222 extend downwardly to connect with the inner face 68 of the cylinder head 12a to thereby provide a support for the section 201 and simultaneously connect with and open into a crossover passage 226 extending across the cylinder head to connect with the intake exhaust opening 20 of the cylinder 6 of the head 12a. In a similar manner the heating chamber 222a for the section 201a has the bottom wall 224a of the chamber 204a as a part thereof and the walls of this heating chamber extend downwardly to connect with the seating face 68 of the cylinder head 12 where the chamber opens into and connects with an exhaust crossover passage 226a associated with the exhaust valve opening 20 of cylinder No. 3 of the cylinder head 12. The heating chambers 222 and 222a are interconnected to permit transfer of heat from one exhaust heating chamber to the other by means of a tube or conduit 228 as best seen in FIGURE 12. It will be understood that the arrangement in FIGURES 12 and 13 may, if desired, be adapted for fuel injection in the manner described in connection with the construction in FIGURES 2 and 5.

FIGURES 14 and 15 illustrate a further modification embodying the principles of our invention and applied to an engine having all its intake and exhaust valves in each cylinder head in a single line and wherein the harmonically tuned air-fuel conducting passages sweep upwardly from the inner faces of the cylinder heads and preferably gather together at the mid portion of the space between the engine banks longitudinally and transversely thereof to there connect with, as shown in FIGURE 14, suitable carburetion illustrated in the form of a pair of side draft dual carburetors. As shown in FIGURE 15, the intake passages 250, 251 in the head 12 connecting with the intake openings 18 for the cylinders 1 and 3 respectively are arranged side-by-side and extend from the inner face 68 of the bank 12 to the intake openings 18. Similarly, the intake passages 252, 253 for the cylinders 5 and 7 in the head 12 are arranged side-by-side and the same is likewise true for the intake passages 250a and 251a for the cylinders 2 and 4 and the intake passages 252a and 253a for the cylinders 6 and 8. Extending from these intake passages from suitable mounting faces on the inner faces of the cylinder heads are pairs of barrels or conduits which extend transversely and longitudinally upwardly preferably forming a continuous smooth curve. One of these pairs 254, having conduits 255, 256, extends from the passages 250, 251 respectively of the head 12. A second pair 257 having conduits 258, 259 extends from the passages 252, 253 respectively, of the head 12. A third pair 254a having conduits 255a and 256a extends from the passages 250a, 251a of the head 12a and a fourth pair 257a having conduits 258a and 259a extends from the passage 252a, 253a of the head 12a. As previously described, these conduits sweep upwardly to the mid portion of the engine and above the plane of the rocker mechanism covers where they may terminate in a common plenum chamber or by a divided chamber such as shown forming compartments 260, 260a, which are preferably interconnected by an opening 261. Thus the conduits 255, 256, 258, and 259 open into the compartment 260 and the conduits 255a, 256a, 258a, and 259a open into the compartment 260a. The compartment 260 has side openings 262, 263 which connect with the dual barrels of a side draft carburetor 264. Similarly, the compartment 260a has side openings 262a and 263a which connect with the dual barrels of a carburetor 264a.

The described arrangement facilitates accessibility to the rocker mechanism of the engine and provides space for accessory mechanism. The air-fuel passages are smooth and unobstructed and are of a length to provide with the intake passages in the cylinder heads harmonic resonant tuning of the induction system. The distance from the intake openings 18 to the inlets of the conduit passages at their connection with the compartments 260, 260a is preferably in accordance with the empirical formulation of our copending application and as set forth above.

It will be understood that the described arrangement of intake barrels may be applied to an engine using continuous fuel injection feed of fuel. In such cases the fuel injection nozzles will be located as shown in FIGURE 14 downstream from the air intake, and the chambers 260, 260a may have suitable air cleaner and throttle control units of the type in FIGURE 3 connected thereto to provide a source of air. Manifestly, the conduits or barrels of the sections 254, 257, 254a, and 257a may be open to the atmosphere and each barrel be provided with individual throttle blades and operating mechanism as shown in our copending application aforesaid.

In FIGURE 16 we have shown our invention as applied to an engine of the form shown in FIGURE 13, and wherein each cylinder has the head intake passage for its intake valve connected by a long conduit or barrel and wherein all of the barrels for both banks of cylinders connect in a common plenum chamber 300 located above one bank of the engine. The lengths of the barrels from the intake valve inlets to their intersection with the plenum chamber will preferably be in accordance with the empirical formula given above and described in our copending application aforesaid and all the barrels from both banks will preferably be of the same length.

Although FIGURE 16 only appears to show a single barrel from each bank, it will be understood that it is intended to depict a plurality of barrels in alignment. Thus all of the barrels 302 from the cylinders 1, 3, 5, and 7 of the cylinder bank 12 corresponding for example to the paired conduits 209, 208, and 214, 216 of FIGURE 13 will be arranged to sweep in a smooth curve from the head inlet passages 210, 212, 214 and 220 respectively to connect with the plenum chamber 300 and open into this chamber. The barrels 302 will preferably be paired in the manner of those in FIGURE 13 and will preferably extend from the bank with which they are connected to the plenum chamber 300 in a substantially straight line as viewed in plan and at a small angle for instance 20° to allow for the offset of the opposite banks of the engine.

In a similar manner, all of the barrels or conduits 304 will sweep upwardly from the head 12a inlet passages 220a, 218a, 212a, and 210a in the direction of bank 12 making a reverse curve when viewed in elevation when approximately at the mid area of the engine and will then extend back in the direction of their starting point at bank 12a to connect with the plenum chamber 300. The barrels 304 will preferably, as in the case of the barrels 302, be paired in the manner illustrated in FIGURE 13 and in spaced side-by-side relationship therewith. The position at which the reverse curve occurs will be dictated by the length of the barrels 302 for which the barrels 304 will have a corresponding length. When the manifolding of FIGURE 16 is to be applied to an engine to be fed by fuel injection, each barrel 302 and 304 will have an injection nozzle 82 positioned upon it preferably located downstream of the air entrance and will be fed with fuel in the manner described in our copending application. Moreover, the plenum chamber 300 will be fed, with air through a dual barrel riser 306 controlled by a tandem throttle 308. The riser may have an air cleaner of suitable capacity associated with it, designated by numeral 310.

If the system is to be carburetor fed, a plurality of carburetors may be connected with the plenum chamber 300 in the manner shown in other forms of our invention.

It will be understood that the plenum chamber 300 may be fed with fuel and/or supercharged air in the manner shown in FIGURE 11. Moreover, the manifolding of FIGURE 16 may be employed with an engine having a valve arrangement as, for example in FIGURES 2 or 5 in which event all the barrels 302, 304 may be uniformly spaced longitudinally of the engine when viewed from above and with their entrance into the plenum chamber 300 preferably in close juxtaposition in order to reduce as much as possible the overall length of the plenum chamber.

In connection with all the above constructions, it may be noted in addition to the observations made above effecting the overall response frequency of the system when harmonic resonance is obtained that the runner or other plenum chambers connecting with the inlet ends of the long tuned branches should preferably have their wall portions facing such branch inlets a sufficient distance from such walls to prevent a loss of dynamic effects and volume of air movement by reason of such wall being too close to such inlet. In certain structures it has been found that a distance of four inches will suffice. Moreover, as a general guide, the volume of the plenum chambers should preferably be at least four times that of the tuned passage although practical considerations may dictate the use of smaller plenum chambers and with some sacrifice in performance.

We claim:

1. In an engine having two banks of cylinders arranged angularly about the crankshaft, cylinder head means on each bank providing a combustion chamber and an inlet opening and passage for each cylinder; intake manifolding means at least in part intermediate said heads and associated with sources of air and fuel for feeding said chambers, said manifolding comprising a pair of elongated runner passage means extending in the lengthwise direction of the engine each in juxtaposition to a different bank of the engine and a plurality of elongated transversely extending passage means one for each cylinder, each said passage means interconnecting the inlet passage of the cylinder which it is to feed and the runner passage means of said pair thereof in juxtaposition to the cylinder bank not containing this cylinder.

2. In an engine having two banks of cylinders arranged agularly about the crankshaft, cylinder head means on each bank providing a combustion chamber and an inlet opening and passage for each cylinder; a plurality of air-fuel mixing means and intake manifolding means at least in part intermediate said heads for receiving air-fuel mixture from said mixing means, said manifolding comprising elongated runner passage means extending lengthwise of the engine adjacent the inner side of each bank and a plurality of elongated transversely extending passage means one for each cylinder interconnecting the inlet passage of the cylinder which it is to feed and the runner passage means adjacent the cylinder bank not containing this cylinder, each of said runner passage means directly connecting with a pair of said mixing means at positions intermediate a different pair of transverse passage means connecting with this runner passage means.

3. In an engine having two banks of cylinders arranged angularly about the crankshaft, cylinder head means in each bank providing a combustion chamber and an inlet opening and passage for each cylinder; intake manifolding means at least in part intermediate said heads, said manifolding comprising elongated runner passage means extending lengthwise of the engine adjacent the inner side of each bank, a plurality of elongated transversely extending passage means one for each cylinder interconnecting the inlet passage of the cylinder which it is to feed and the runner passage means adjacent the cylinder bank not containing this cylinder, a pair of air intakes on each said runner passage means at positions intermediate a different pair of transverse passage means connecting with such runner passage means, a throttle on each of said air intakes, and fuel injection means for supplying fuel to each transverse passage means.

4. In an engine having two banks of cylinders arranged angularly about the crankshaft, cylinder head means in each bank providing a combustion chamber and an inlet opening and passage for each cylinder; intake manifolding means at least in part intermediate said heads, said manifolding comprising elongated runner passage means extending lengthwise of the engine adjacent the inner side of each bank, a plurality of elongated transversely extending passage means one for each cylinder interconnecting the inlet passage of the cylinder which it is to feed and the runner passage means adjacent the cylinder bank not containing this cylinder, air intake means connecting with each of said runner passage means including throttle means for controlling the flow of air through said air intake, and fuel injection means for supplying fuel to each transverse passage means.

5. In an engine having two banks of cylinders arranged angularly about the crankshaft, cylinder head means in each bank providing a combustion chamber and an inlet opening and passage for each cylinder; intake manifolding means at least in part intermediate said heads, said manifolding comprising elongated runner passage means extending lengthwise of the engine adjacent the inner side of each bank, a plurality of elongated transversely extending passage means one for each cylinder interconnecting the inlet passage of the cylinder which it is to feed and the runner passage means adjacent the cylinder bank not containing this cylinder, air intake means including air cleaner means connecting each of said runner passage means, throttle means in said air intake means for controlling the flow of air through said air intake means, and fuel injection means for supplying fuel to each transverse passage means.

6. In an engine having two banks of cylinders arranged angularly about the crankshaft, cylinder head means on each bank providing a combustion chamber and an inlet opening and passage for each cylinder; intake manifolding means at least in part intermediate said heads associated with sources of air and fuel for feeding said chambers, said manifolding comprising elongated runner passage means extending lengthwise of the engine adjacent the inner side of each bank, a plurality of elongated transversely extending passage means one for each cylinder interconnecting the inlet passage of the cylinder which it is to feed and the runner passage means adjacent the cylinder bank not containing this cylinder, and a balancing passage interconnecting said runner passage means of said two banks at positions intermediate the innermost pair of transverse passage means longitudinally of said runner passage means.

7. In an engine having two banks of cylinders arranged angularly about the crankshaft, cylinder head means on each bank providing a combustion chamber and an inlet opening and passage for each cylinder; intake manifolding means at least in part intermediate said heads associated with sources of air and fuel for feeding said cylinders, said manifolding comprising a pair of distribution chamber means each positioned adjacent a different bank of the engine and in a plane above said heads, and a plurality of elongated transversely extending passage means one for each cylinder interconnecting the inlet passage of the cylinder which it is to feed and the distribution chamber means of said pair thereof adjacent the cylinder bank not containing this cylinder.

8. In an engine having two banks of cylinders arranged angularly about the crankshaft, cylinder head means on each bank providing a combustion chamber and an inlet opening and passage for each cylinder; intake manifolding means at least in part intermediate said heads associated with sources of air and fuel for feeding said chambers, said manifolding comprising elongated runner passage means extending lengthwise of the engine adjacent the inner side of each bank, a plurality of elongated transversely extending passage means one for each cylinder interconnecting the inlet passage of the cylinder which it is to feed and the runner passage means adjacent the cylinder bank not containing this cylinder, distribution chamber means positioned above said transversely extending passage means intermediate the ends of said runner passage means and conduit means interconnecting said distribution chamber means with each of said runner passage means.

9. An engine intake manifolding as claimed in claim 8 wherein a pair of said conduit means extend from each end of said distribution chamber means, one conduit of each pair connecting with the runner passage means adjacent one bank and the other with the runner passage means adjacent the other bank and each of said conduit means connecting with its runner passage means at a position intermediate a pair of said transverse passage means.

10. An engine intake manifolding as claimed in claim 8 wherein there are a plurality of said distribution chamber means and wherein there is a single conduit means interconnecting each said distribution chamber means with each said runner passage means.

11. An engine intake manifolding as claimed in claim 8 wherein there is a distribution chamber means above each of said runner passage means and wherein there is a pair of conduit means connecting each said distribution chamber means and the runner passage means which it is above and at positions intermediate a pair of said transverse passage means.

12. In an engine having two banks of cylinders arranged angularly about the crankshaft, cylinder head means on each bank providing a combustion chamber and an inlet opening and passage for each cylinder; intake manifolding means at least in part intermediate said heads, said manifolding comprising two distribution chamber means one positioned in juxtaposition to one bank and the other positioned in juxtaposition to the other bank, each in a plane above said heads, a plurality of elongated transversely extending passage means one for each cylinder interconnecting the inlet passage of the cylinder which it is to feed and the distribution chamber means in juxtaposition to the cylinder bank not containing this cylinder, air blower means having its discharge side interconnecting each of said distribution chamber means and having an inlet side, throttle means in said inlet side, and fuel injection nozzle means in said inlet side.

13. In an engine having two banks of cylinders arranged angularly about the crankshaft, cylinder head means on each bank providing a combustion chamber and an inlet opening and passage for each cylinder; intake manifolding means at least in part intermediate said heads, said manifolding comprising two distribution chamber means one positioned in juxtaposition to one bank and the other positioned in juxtaposition to the other bank, each in a plane above said heads, a plurality of elongated transversely extending passage means one for each cylinder interconnecting the inlet passage of the cylinder which it is to feed and the distribution chamber means in juxtaposition to the cylinder bank not containing this cylinder, air blower means having its discharge side interconnecting each of said distribution chamber means and having an inlet side, throttle means in said inlet side, and fuel injection means positioned in each of said transversely extending passage means.

14. In an engine having two opposite banks of cylinders arranged angularly about the crankshaft, cylinder head means on each bank providing a combustion chamber and an inlet opening and passage for each cylinder; intake manifolding means at least in part intermediate said banks, said manifolding comprising a distribution chamber means positioned in juxtaposition to each bank and in a plane above said heads, said chamber means each having opposite side walls, a pair of elongated passage means extending longitudinally and transversely of the engine from one side wall of one chamber means to a pair of inlet passages of a pair of adjacent cylinders of the bank opposed to that which this one chamber means is adjacent, a second pair of elongated passage means extending longitudinally and transversely of the engine from the opposite side wall of said one chamber means to a pair of inlet passages of a second pair of adjacent cylinders of the same bank containing said first pair of cylinders, a third pair of elongated passage means extending longitudinally and transversely of the engine from one side wall of the other chamber means to a pair of inlet passages of a pair of adjacent cylinders of the bank opposite that to which this other chamber means is adjacent, and a fourth pair of elongated passage means extending longitudinally and transversely of the engine from the opposite side wall of this other chamber means to a pair of inlet passages of a pair of adjacent cylinders in the same bank as said last-mentioned cylinders.

15. In an engine having two banks of cylinders arranged angularly about the crankshaft, cylinder head means on each bank providing a combustion chamber and an inlet opening and passage for each cylinder; intake manifolding means at least in part intermediate said heads associated with sources of air and fuel for feeding said chambers, said manifolding comprising a pair of elongated runner passage means extending lengthwise of the engine one adjacent the inner side of each bank and a plurality of elongated transversely extending passage means one for each cylinder interconnecting the inlet passage of the cylinder which it is to feed and the runner passage means of said pair thereof adjacent the cylinder bank not containing this cylinder.

16. In an engine having two banks of cylinders arranged angularly about the crankshaft, cylinder head means on each bank providing a combustion chamber and an inlet opening and passage for each cylinder; intake manifolding means at least in part intermediate said heads associated with sources of air and fuel for feeding said cylinders, said manifolding comprising a pair of distribution chamber means one positioned adjacent the inner side of each bank and in a plane above said heads, and a plurality of elongated transversely extending passage means one for each cylinder interconnecting the inlet passage of the cylinder which it is to feed and the distribution chamber means of said pair thereof adjacent the cylinder bank not containing this cylinder.

17. In an engine having two banks of cylinders arranged angularly about the crankshaft, cylinder head means on each bank providing a combustion chamber and an inlet opening and passage for each cylinder; intake manifolding means at least in part intermediate said heads associated with sources of air and fuel for feeding said cylinders, said manifolding comprising distribution chamber means positioned in juxtaposition to one of said banks, and a plurality of elongated transversely extending passage means one for each cylinder interconnecting the inlet passage of the cylinder which it is to feed and said distribution means, the said passage means which are to connect with the inlet passages of the cylinders of said one bank extending from said distribution chamber means in the direction of the other bank to a point intermediate said banks and then reversing their direction by a return bend before connecting with the said inlet passages of said one bank.

18. In an engine having two banks of cylinders arranged angularly about the crankshaft, cylinder head means on each bank providing a combustion chamber and an inlet opening and passage for each cylinder; intake manifolding means at least in part intermediate said heads associated with a source of air and fuel for feeding said cylinders, said manifolding comprising a pair of distribution chamber means one positioned in juxtaposition to each bank, a plurality of elongated transversely extending passage means one for each cylinder interconnecting the inlike passage of the cylinder which it is to feed and the distribution chamber means of said pair thereof adjacent the cylinder bank not containing this cylinder and heat exchange means on each said distribution chamber means connecting with a source of heat in the juxtapositioned bank.

19. In an engine having two banks of cylinders arranged angularly about the crankshaft, each bank having at least three cylinders, cylinder head means on each bank providing a combustion chamber and an inlet opening and passage for each cylinder; intake manifolding means at least in part intermediate said heads associated with sources of air and fuel for feeding said cylinders, said manifolding means comprising a pair of distribution chamber means each positioned adjacent a different bank of the engine and in a plane above said heads, each distribution chamber means having an inner side wall and end walls, and a plurality of elongated transversely extending passage means one for each cylinder interconnecting the inlet passage of the cylinder which it is to feed and the distribution chamber means of said pair thereof adjacent the cylinder bank not containing this cylinder, the endmost of said transverse passage means connecting with its chamber means through the end walls thereof and the remainder of said transverse passage means connecting with its chamber means through the inner wall thereof.

20. In an engine having two banks of cylinders arranged angularly about the crankshaft, cylinder head means on each bank providing a combustion chamber and an inlet opening and passage for each cylinder; intake manifolding means at least in part intermediate said heads associated with sources of air and fuel for feeding said cylinders, said manifolding comprising a pair of distribution chamber means each positioned adjacent a different bank of the engine and in a plane above said heads, and a plurality of elongated transversely extending passage means one for each cylinder interconnecting the inlet passage of the cylinder which it is to feed and the distribution chamber means of said pair thereof adjacent the cylinder bank not containing this cylinder, said transversely extending passage means being grouped in pairs and the members of said pairs generally paralleling each other.

21. In an engine having two banks of cylinders arranged angularly about the crankshaft, cylinder head means on each bank providing a combustion chamber and an inlet opening and passage for each cylinder; intake manifolding means at least in part intermediate said heads associated with sources of air and fuel for feeding said cylinders, said manifolding comprising a pair of distribution chamber means each positioned adjacent a different bank of the engine and in a plane above said heads, and a plurality of elongated transversely extending passage means one for each cylinder interconnecting the inlet passage of the cylinder which it is to feed and the distribution chamber means of said pair thereof adjacent the cylinder bank not containing this cylinder, each transversely extending passage means and its connecting inlet passage defining an intake passage whose length in inches from the inlet opening to the inlet of said passage means where it connects with the distribution chamber means is approximately $72C/N \pm 3$ where N is the engine speed in revolutions per minute at which the engine power performance is to substantially peak and C is the velocity in sound of feet per second in air under the atmospheric and pressure conditions at which the engine is to be operated.

22. In an engine having two banks of cylinders arranged angularly about the crankshaft, cylinder head means on each bank providing a combustion chamber and an inlet opening and passage for each cylinder; intake manifolding means at least in part intermediate said heads associated with sources of air and fuel for feeding said cylinders, said manifolding comprising a pair of distribution chamber means each positioned adjacent a different bank of the engine and in a plane above said heads, and a plurality of elongated transversely extending passage means one for each cylinder interconnecting the inlet passage of the cylinder which it is to feed and the distribution chamber means of said pair thereof adjacent the cylinder bank not containing this cylinder, air cleaner means and throttle means associated with said distribution chamber means, a fuel inlet in each of said transversely extending passage means downstream from its distribution chamber means, and means for supplying fuel to said fuel inlets.

23. In an engine having two banks of cylinders arranged angularly about the crankshaft, cylinder head means on each bank providing a combustion chamber and an inlet opening and passage for each cylinder; intake manifolding means to which fuel for combustion is supplied, said manifolding comprising opposite distribution chambers each disposed in juxtaposition to a different bank of the engine and each connecting by transversely directed elongated branch conduits with the intake passages of the cylinders of the bank of cylinders opposite that bank to which it is juxtaposed.

24. In an engine having two banks of cylinders arranged angularly about the crankshaft, cylinder head means on each bank providing a combustion chamber and an inlet port and passage and exhaust port for each cylinder, said engine having the said ports of each bank substantially aligned longitudinally of the engine and the inlet ports of pairs of different cylinders of each bank being in adjacency; intake manifolding means for feeding a combustible mixture to said chambers comprising distribution chamber means spaced from and arranged a substantial distance above said banks and a plurality of elongated conduits, one for each cylinder connecting the inlet ports and passages with said distribution chamber means, said conduits being arranged in pairs and the conduits of each pair extending in juxtaposition to each other and interconnecting said distribution chamber means and a pair of said inlet ports which are in said adjacency with each other, each said conduit together with its connecting inlet passage defining an intake passage whose length in inches is approximately $72C/N \pm 3$, where N is the engine speed in revolutions per minute at which the engine power performance is to substantially peak and C is the velocity of sound in feet per second in air under the atmospheric and pressure conditions at which the engine is to be operated.

25. In an engine having two banks of cylinders arranged angularly about the crankshaft, cylinder head means on each bank providing a combustion chamber and an inlet opening and passage for each cylinder; intake manifolding means to which fuel for combustion is supplied, said manifolding comprising opposite distribution chambers each disposed in juxtaposition to a different bank of the engine and each connecting by transversely directed elongated branch conduits with the intake passages of the cylinders of the bank of cylinders opposite that bank to which it is juxtaposed, and conduit means interconnecting said opposed distribution chambers.

26. In an engine having two banks of cylinders arranged angularly about the crankshaft, cylinder head means on each bank providing a combustion chamber and an inlet opening and passage for each cylinder; intake manifolding means at least in part intermediate said heads, said manifolding comprising two distribution chamber means, one positioned in juxtaposition to one bank and the other positioned in juxtaposition to the other bank, a plurality of elongated transversely extending passage means one for each cylinder interconnecting the inlet passage of the cylinder which it is to feed and the distribution chamber means in juxtaposition to the cylinder bank not containing this cylinder, air supply means having its discharge side interconnecting each of said distribution chamber means and having an inlet side, throttle means for controlling the delivery of air to said chamber means, and fuel injection nozzle means for supplying fuel for admixture with said air.

27. In an engine having a cylinder block providing a row of cylinders, cylinder head means on said block providing a combustion chamber and an inlet opening and passage for each cylinder; intake manifolding means for said cylinders to which fuel for combustion is supplied comprising distribution means positioned adjacent said cylinder head means and a plurality of elongated transversely extending passage means, one for each cylinder interconnecting the inlet passage of the cylinder it is to feed and said distribution means, each said passage means extending from said distribution means in a direction away from said distribution means and cylinder head and then reversing in direction by a return bend before connecting with the said inlet passages.

28. In an engine having a cylinder block providing a row of cylinders, cylinder head means on said block providing a combustion chamber and an inlet opening and passage for each cylinder; intake manifolding means for said cylinders to which fuel for combustion is supplied comprising a plurality of elongated transversely extending passage means, one for each cylinder connecting with the inlet passage of the cylinder it is to feed, each said passage means having a portion extending outwardly from said inlet passage away from said cylinder head for a predetermined distance, then reversing in direction by a return bend and extending by a second portion in a plane above said first portion to a point adjacent said head, and a common distribution means for all said passage means connecting therewith.

29. In an engine having two banks of cylinders arranged angularly about the crankshaft, cylinder head means on each bank providing a combustion chamber and an inlet opening and passage for each cylinder; intake manifold means at least in part intermediate said head means and adapted to be fed with air and fuel, said manifold comprising distribution chamber means spaced from said banks and positioned intermediate the end cylinders thereof and in a plane a substantial distance above said heads, and a plurality of elongated passage means, one for each cylinder, extending transversely of the engine and sweeping upwardly in the space between said banks to connect with said distribution chamber means, said passage means being arranged in pairs and each passage means of a pair being in side-by-side relation and having a common wall over a major portion of its length with the other passage means of its pair and the said passage means of each pair connecting with the inlet passages of a pair of juxtaposed cylinders of one bank each said elongated passage means together with its connecting inlet passage defining an intake passage whose length in inches is approximately $72C/N \pm 3$, where N is the engine speed in revolutions per minute at which the engine power performance is to substantially peak, and C is the velocity of sound in feet per second in air under the atmospheric and pressure conditions at which the engine is to be operated.

30. In an engine having two opposite banks of cylinders arranged angularly about the crankshaft, cylinder head means on each bank providing a combustion chamber and an inlet opening and passage for each cylinder, intake manifold means at least in part intermediate said banks, said manifold means comprising a plurality of elongated intake stacks, one for each cylinder and connecting with the intake passage for that cylinder, said stacks extending transversely and substantially vertically upwardly a substantial distance above the cylinder heads to adjacent the mid portion longitudinally of the space between said cylinder banks, said stacks being paired side-by-side and said paired stacks having a common wall over a major portion of their length each said stack together with its connecting inlet passage defining an intake passage whose length in inches is approximately $$72C/N \pm 3$$

where N is the egine speed in revolutions per minute at which the engine power performance is to substantially peak, and C is the velocity of sound in feet per second in air under the atmospheric and pressure conditions at which the engine is to be operated.

31. Intake manifolding as claimed in claim 30 wherein the outer ends of the stacks terminate in a chamber, said chamber having a pair of lateral air intakes.

32. Intake manifolding as claimed in claim 30 wherein each stack is provided with a nozzle means for supplying it with fuel by injection and the outer ends of the stacks are associated with a source of air.

33. In an engine having a crankshaft, a cylinder block providing a row of cylinders having their axes in a common plane at an angle to the vertical, cylinder head means on said block providing a combustion chamber and an inlet opening and passage for each cylinder, intake manifold means for said cylinders and charge forming means for feeding said manifold means, said manifold means comprising a generally horizontal distribution chamber connecting with said charge forming means and spaced from said cylinder head at a position outwardly beyond a vertical plane through the crankshaft axis of said engine, and a plurality of elongated transversely extending passage means, one for each cylinder interconnecting the inlet passage of the cylinder it is to feed said distribution chamber, said plurality of passage means being arranged in pairs with the members of said pairs in side-by-side relationship and having a common wall over a major portion of their length.

34. In an engine having a crankshaft, a cylinder block providing a row of cylinders having their axes in a common plane and at an angle to the vertical, cylinder head means on said block providing a combustion chamber and an inlet opening and passage for each cylinder, intake manifold means for said cylinders and charge forming means for feeding said manifold means, said manifold means comprising a generally horizontal distribution chamber connecting with said charge forming means and spaced from said cylinder head at a position outwardly beyond a vertical plane through the crankshaft axis of the engine such that said vertical plane is intermediate said chamber and said cylinder head and a plurality of elongated transversely extending passage means one for each cylinder interconnecting the inlet passage of the cylinder it is to feed and said distribution chamber.

35. In an engine having a crankshaft, a cylinder block providing a row of cylinders having their axes in a common plane and at an angle to the vertical, cylinder head means on said block providing a combustion chamber and an inlet opening and passage for each cylinder, intake manifold means for said cylinders and charge forming means for feeding said manifold means, said manifold means comprising a generally horizontal distribution chamber connecting with said charge forming means and spaced laterally outwardly from said cylinder head, and a plurality of elongated passage means, one for each cylinder extending transversely from said distribution chamber and directly interconnecting with the inlet passage of the cylinder it is to feed, each said passage means together with its connecting inlet passage defining an intake conduit whose length in inches is approximately $72C/N \pm 3$ where N is the engine speed in revolutions per minute at which the engine power performance is to substantially peak and C is the velocity of sound in feet per second in air under the atmospheric and pressure conditions at which the engine is to be operated.

36. In an engine having a crankshaft, a cylinder block providing a row of cylinders having their axes in a common plane and at an angle to the vertical, cylinder head means on said block providing a combustion chamber and an inlet opening and passage for each cylinder, intake manifold means for said cylinders and charge forming means for feeding said manifold means, said manifold means comprising a generally horizontal distribution chamber connecting with said charge forming means and spaced laterally outwardly from said cylinder head and from a vertical plane through the crankshaft axis of said engine, and a plurality of elongated passage means, one for each cylinder extending transversely from said distribution chamber and directly interconnecting with the inlet passage of the cylinder it is to feed.

37. In an engine having two opposite banks of cylinders arranged angularly about the crankshaft, cylinder head means on each bank providing a combustion chamber and an inlet opening and passage for each cylinder, intake manifold means at least in part intermediate said banks, said manifold means comprising a plurality of elongated intake stacks, one for each cylinder and connecting with the intake passage for that cylinder, said stacks extending transversely and substantially vertically upwardly above said banks of cylinders to adjacent the mid portion longitudinally of the space between said cylinder banks and each of said stacks together with its connecting inlet passage defining an intake conduit whose length in inches is approximately $72C/N \pm 3$ where N is the engine speed in revolutions per minute at which the engine power performance is to substantially peak and C is the velocity of sound in feet per second in air under the atmospheric and pressure conditions at which the engine is to be operated.

38. An intake manifold for an internal combustion engine having a pair of angularly disposed banks of cylinders, said manifold comprising a pair of plenum chambers adapted to be disposed on the opposite sides of said engine, ram pipes adapted to extend transversely of said engine for interconnecting said plenum chambers with said cylinders, inlets to said chambers for supplying air thereto, duct means communicating with the atmosphere and interconnecting said inlets with each other for supplying air thereto, and throttle means for controlling said supply.

39. An intake manifold for an internal combustion engine having a pair of angularly disposed cylinder banks, said manifold comprising a pair of plenum chambers adapted to be disposed on the opposite sides of said engine adjacent said cylinder banks, a separate set of ram pipes for each of said chambers, each of said sets of ram pipes being adapted to interconnect said plenum chambers with a group of said cylinders, a separate inlet for each of said plenum chambers for supplying throttled amounts of induction air thereto, duct means interconnecting said inlets and communicating with the atmosphere for drawing air therefrom.

40. In an induction system for an internal combustion engine having a pair of angularly disposed banks of cylinders, an intake manifold having plenum chamber means, inlet means interconnecting said plenum chamber means with the atmosphere and having a throttle valve therein for regulating the flow of air therethrough, a first set of substantially identical ram pipes having the upper ends thereof forming a first row of openings into said plenum chamber means along one side thereof, said ram pipes having the lower ends thereof interconnected with the cylinders on an opposite side of said engine, a second set of substantially identical ram pipes having the upper ends thereof forming a second row of openings into said plenum chamber means along said second side, the lower ends of said second set of ram pipes communicating with the cylinders on said first side of said engine.

41. Charge forming means for an internal combustion engine having a pair of angularly disposed banks of cylinders, said charge forming means comprising an intake manifold having plenum chamber means with a throttled inlet and a first set and a second set of substantially identical ram pipes, the ram pipes in each of said sets having the upper ends thereof forming a row of openings into said plenum chamber means along a side thereof parallel to one of said banks and the lower ends thereof communicating with the cylinders in the other of said banks, fuel metering means responsive to the air flow into said engine and effective to meter the fuel in proportion thereto, injector nozzles interconnected with said metering means and communicating with said ram pipes for injecting said metered fuel into the charge flowing therethrough.

42. An intake manifold for an internal combustion engine having a pair of angularly disposed cylinder banks, said manifold comprising a pair of plenum chambers adapted to be disposed on the opposite sides of said engine adjacent said cylinder banks, a first set of ram pipes for one of said plenum chambers for interconnecting said chamber with one group of cylinders, a second set of ram pipes for the other of said plenum chambers for interconnecting that chamber with another group of cylinders, a separate inlet to each of said chambers, duct means interconnecting said inlets for delivering air to said inlets, and throttle means for controlling the amount of air flow to said cylinders.

43. In an internal combustion engine having a pair of angularly disposed banks of cylinders with an upwardly opening space therebetween, an intake manifold comprising a pair of elongated plenum chambers disposed on the opposite sides of said engine and extending longitudinally thereof substantially parallel to said banks, a separate set of ram pipes for each of said chambers for interconnecting the chamber on one side with the cylinders in the bank on the opposite side, a separate inlet for each of said chambers for supplying air thereto, a duct extending transversely of said engine to communicate with the atmosphere and interconnecting said inlets with each other for supplying air thereto, and throttle means for controlling the air flow to said chambers.

44. Charge forming means for a multicylinder engine having a pair of angularly disposed banks of cylinders, said means comprising an intake manifold having a plenum chamber adapted to be disposed over one of said banks of cylinders to extend longitudinally of said engine, a first group of ram pipes intersecting said chamber to form a row of ports extending longitudinally thereof for interconnecting said chamber with the cylinders in one of said banks, a second group of ram pipes intersecting said chamber to form a second row of ports extending longitudinally thereof and spaced from said first row of ports to interconnect said chamber with the cylinders in the other of said banks, an atmospheric inlet intersecting said chamber so as to have a throttle body mounted thereon.

45. An intake manifold for an internal combustion engine having a pair of angularly disposed banks of cylinders each of which includes a plurality of cylinders charged by intake passages having intake valves therein, said intake manifold comprising elongated chamber means for receiving a charge, throttle means for controlling the charge delivered to said chamber means, separate ram pipe induction passages for each of said cylinders, said ram pipes forming two separate sets, the inlet ends of the pipe in each set being interconnected with said chamber means and forming a pair of spaced parallel rows of ports extending longitudinally along a side portion of said chamber means, the outlet ends of said ram pipe induction passages being positioned to communicate with said intake passages for the cylinders in the bank on the side remote from their connection with said chamber means.

References Cited by the Examiner

UNITED STATES PATENTS

| | | | |
|---|---|---|---|
| 951,252 | 3/1910 | Loomis | 123—52 |
| 1,355,068 | 10/1920 | Vincent | 123—52 |
| 2,113,077 | 4/1938 | Buchi | 123—52 |
| 2,127,079 | 8/1938 | Barkeij | 123—52 |
| 2,160,922 | 6/1939 | Sullivan | 123—52 |
| 2,232,413 | 2/1941 | Steskal | 123—122 |
| 2,294,326 | 8/1942 | Wirth | 123—122 |
| 2,331,885 | 10/1943 | Blood | 123—122 |
| 2,382,244 | 8/1945 | Lundquist et al. | 123—52 |
| 2,456,605 | 12/1948 | Wirth et al. | 123—139.17 |
| 2,523,611 | 9/1950 | Clayton | 123—52 |
| 2,563,939 | 8/1951 | Kishline | 123—139.17 XR |
| 2,676,603 | 4/1954 | Kollsman | 123—139.17 |
| 2,725,859 | 12/1955 | Turlay | 123—52 |
| 2,730,339 | 1/1956 | Fresnell | 123—52 |
| 2,764,961 | 10/1956 | Rothwell | 123—52 |
| 2,845,912 | 8/1958 | Bird | 123—52 |
| 2,871,841 | 2/1959 | Goodridge et al. | 123—52 |
| 2,882,875 | 4/1959 | Kolbe | 123—52 |
| 2,909,165 | 10/1959 | Dolza | 123—52 |
| 2,916,027 | 12/1959 | Chayne et al. | |
| 2,957,464 | 10/1960 | Dolza | 123—52 |

FOREIGN PATENTS 518,518  2/1940  Great Britain.

MARK NEWMAN, *Primary Examiner.*

KARL J. ALBRECHT, RALPH H. BRAUNER,
*Examiners.*

F. T. SADLER, *Assistant Examiner.*